(12) United States Patent
Izawa et al.

(10) Patent No.: US 10,314,452 B2
(45) Date of Patent: Jun. 11, 2019

(54) VACUUM CLEANER

(71) Applicant: TOSHIBA LIFESTYLE PRODUCTS & SERVICES CORPORATION, Kawasaki-shi (JP)

(72) Inventors: Hirokazu Izawa, Aisai (JP); Yuuki Marutani, Nagakute (JP); Kota Watanabe, Seto (JP); Kazuhiro Furuta, Seto (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 0 days.

(21) Appl. No.: 15/531,316

(22) PCT Filed: Dec. 24, 2015

(86) PCT No.: PCT/JP2015/086093
§ 371 (c)(1),
(2) Date: May 26, 2017

(87) PCT Pub. No.: WO2016/104640
PCT Pub. Date: Jun. 30, 2016

(65) Prior Publication Data
US 2017/0360266 A1 Dec. 21, 2017

(30) Foreign Application Priority Data

Dec. 25, 2014 (JP) .................................. 2014-263071

(51) Int. Cl.
*A47L 9/28* (2006.01)
*G05D 1/02* (2006.01)
(Continued)

(52) U.S. Cl.
CPC ................. *A47L 9/28* (2013.01); *G05D 1/02* (2013.01); *G05D 1/0251* (2013.01); *G06T 7/579* (2017.01);
(Continued)

(58) Field of Classification Search
CPC ................ A47L 9/28; G06T 7/70; G05D 1/02
(Continued)

(56) References Cited

U.S. PATENT DOCUMENTS

| 9,504,369 B2 | 11/2016 | So et al. |
| 2002/0091466 A1* | 7/2002 | Song ........................ A47L 9/009 |
| | | 700/245 |

(Continued)

FOREIGN PATENT DOCUMENTS

| GB | 2 500 214 A | 9/2013 |
| JP | 2005-218560 A | 8/2005 |

(Continued)

OTHER PUBLICATIONS

Extended European Search Report dated Jul. 16, 2018 in European Patent Application No. 15873208.1, 8 pages.
(Continued)

*Primary Examiner* — Marthe Y Marc-Coleman
(74) *Attorney, Agent, or Firm* — Oblon, McClelland, Maier & Neustadt, L.L.P.

(57) ABSTRACT

A vacuum cleaner includes a main casing, driving wheels, a control unit, a cleaning unit, cameras, and a depth calculation part. The driving wheels enable the main casing to travel. The control unit controls drive of the driving wheels to make the main casing autonomously travel. The cleaning unit cleans a floor surface. The cameras are disposed apart from each other in the main casing to pick up images on a traveling-direction side of the main casing with their fields of view overlapping with each other. The depth calculation
(Continued)

part calculates a depth of an object distanced from the cameras based on images picked up by the cameras. The vacuum cleaner has improved obstacle detection precision.

14 Claims, 8 Drawing Sheets

(51) Int. Cl.
    *G06T 7/70*     (2017.01)
    *G06T 7/579*     (2017.01)

(52) U.S. Cl.
    CPC ............. *G06T 7/70* (2017.01); *A47L 2201/04* (2013.01); *G05D 2201/0203* (2013.01); *G06T 2207/10016* (2013.01); *G06T 2207/30261* (2013.01)

(58) Field of Classification Search
    USPC ............................ 701/23, 28; 702/159; 901/1
    See application file for complete search history.

(56) References Cited

U.S. PATENT DOCUMENTS

| | | | |
|---|---|---|---|
| 2005/0171644 A1* | 8/2005 | Tani | A47L 9/009 700/253 |
| 2007/0029962 A1 | 2/2007 | Saeki | |
| 2011/0202175 A1* | 8/2011 | Romanov | A47L 11/4011 700/250 |
| 2013/0241217 A1 | 9/2013 | Hickey et al. | |
| 2014/0124004 A1* | 5/2014 | Rosenstein | A47L 9/2852 134/18 |
| 2014/0166047 A1 | 6/2014 | Hillen et al. | |
| 2014/0324271 A1 | 10/2014 | Oh et al. | |
| 2014/0336863 A1 | 11/2014 | So et al. | |
| 2015/0362921 A1 | 12/2015 | Hanaoka et al. | |

FOREIGN PATENT DOCUMENTS

| | | | |
|---|---|---|---|
| JP | 2005-230032 A | | 9/2005 |
| JP | 2005230032 A | * | 9/2005 |
| JP | 2006-209644 A | | 8/2006 |
| JP | 2007-037713 A | | 2/2007 |
| JP | 2007-163223 A | | 6/2007 |
| JP | 2013-235351 A | | 11/2013 |
| JP | 2014-048842 A | | 3/2014 |
| JP | 2014048842 A | * | 3/2014 |
| JP | 2014-194729 A | | 10/2014 |
| JP | 2014-527841 A | | 10/2014 |
| KR | 10-2014-0133369 A | | 11/2014 |
| WO | WO 2014/132509 A1 | | 9/2014 |

OTHER PUBLICATIONS

International Search Report dated Mar. 8, 2016 in PCT/JP2015/086093, filed Dec. 24, 2015.

* cited by examiner

VACUUM CLEANER

TECHNICAL FIELD

Embodiments described herein relate generally to a vacuum cleaner which is capable of autonomously traveling.

BACKGROUND ART

Conventionally, there has been known a so-called autonomous-traveling type vacuum cleaner (cleaning robot) which cleans a floor surface as a cleaning-object surface while autonomously traveling on the floor surface.

Such a vacuum cleaner is required to avoid obstacles during its traveling. For this reason, the vacuum cleaner uses sensors, such as ultrasonic sensors and infrared sensors, for detection of obstacles that obstruct travel. However, for example, with the use of an ultrasonic sensor, presence of a soft curtain, thin cords, or the like in a traveling direction hinders ultrasonic waves from being properly reflected, making it difficult to detect these objects as obstacles. Also, with the use of an infrared sensor as an example, when a black object, a thin cord, or the like is present as a detection object, it is impossible for the vacuum cleaner to properly receive infrared rays reflected therefrom, hence making it difficult to detect obstacles.

That is, with such an autonomous-traveling type vacuum cleaner, while improving its obstacle detection precision makes it possible to improve cleaning performance with stable traveling, failure to detect an obstacle would lead to collision with or stranding on the obstacle or the like, causing a travel stop or the like with cleaning stagnated as a result.

Therefore, for autonomous-traveling type vacuum cleaners, detection of obstacles is important in order to fulfill a smoother cleaning, and improvement of obstacle detection precision is desired.

CITATION LIST

Patent Literature

PTL 1: Japanese Laid-open Patent Publication No. 2007-163223
PTL 2: Japanese Laid-open Patent Publication No. 2013-235351

SUMMARY OF INVENTION

Technical Problem

An object of the invention is to provide a vacuum cleaner having improved obstacle detection precision.

Solution to Problem

A vacuum cleaner in an embodiment includes a main casing, driving wheels, a control unit, a cleaning unit, cameras, and a calculator. The driving wheels enable the main casing to travel. The control unit controls drive of the driving wheels to make the main casing autonomously travel. The cleaning unit cleans a cleaning-object surface. The cameras are placed apart from each other in the main casing to pick up images on a traveling-direction side of the main casing with their fields of view overlapping with each other. The calculator calculates a depth of an object distanced from the cameras based on images picked up by the cameras.

DESCRIPTION OF EMBODIMENTS

Hereinbelow, a first embodiment will be described in terms of its constitution with reference to the accompanying drawings.

Figure 7:
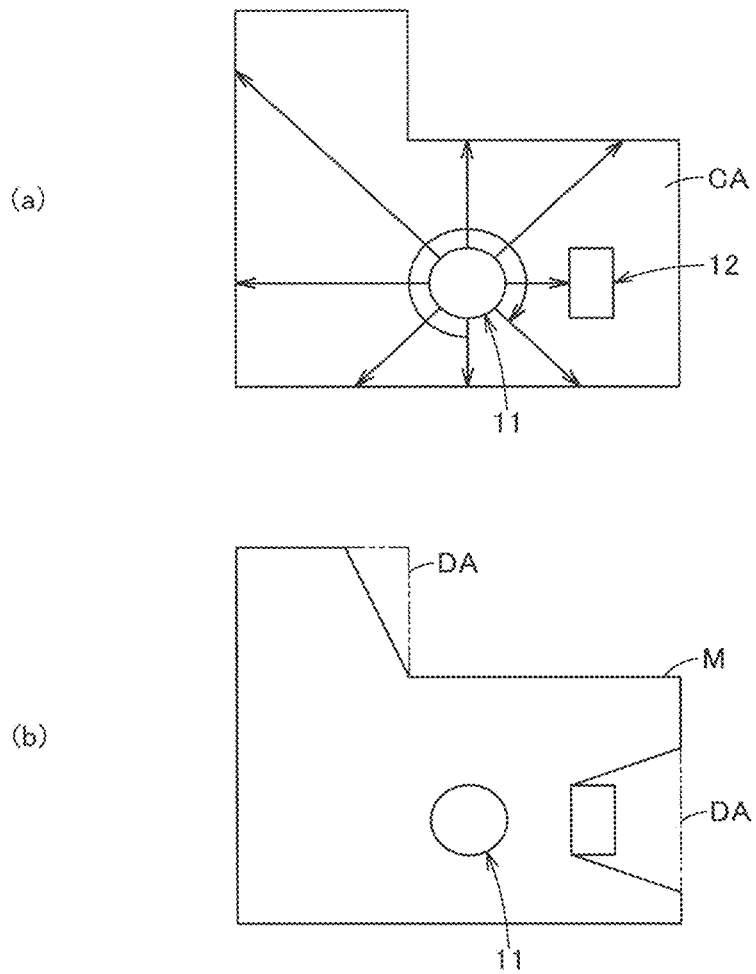
FIG. 7 (*a*) is an explanatory view schematically showing a map generation method by a map generation part of the vacuum cleaner, and (*b*) is an explanatory view showing a map generated by (*a*)

In FIGS. 1 to 4, reference sign 11 denotes a vacuum cleaner. This vacuum cleaner 11 constitutes a vacuum cleaner device (vacuum cleaner system) in combination with an unshown charging device (charging stand) 12 (FIG. 7(*a*)) as a base device serving as a base station for charging of the vacuum cleaner 11. Then, the vacuum cleaner 11, in this embodiment, is a so-called self-propelled robot cleaner (cleaning robot) which cleans a floor surface that is a cleaning-object surface as a traveling surface while autonomously traveling (self-propelled to travel) on the floor surface, the vacuum cleaner being enabled to perform wired or wireless communications with a general-purpose server 16 as data storage means (a data storage part) or a general-purpose external device 17 as display means (a display part) via an (external) network 15 such as the Internet, for example, by performing communication (signal transmission and reception) with a home gateway (router) 14 as relay means (a relay part) disposed in a cleaning area or the like by using wired communication or wireless communication such as Wi-Fi (registered trademark) or Bluetooth (registered trademark).

Further, the vacuum cleaner 11 includes a hollow main casing 20, a traveling part 21 for making the main casing 20 travel on a floor surface, a cleaning unit 22 for cleaning dust and dirt on the floor surface or the like, a communication part 23 for performing communication with an external device including the charging device 12, an image pickup part 25 for picking up images, a sensor part 26, a control unit (controller) 27 as control means for controlling the traveling part 21, the cleaning unit 22, the communication part 23, the image pickup part 25, and the like, and a secondary battery 28 for supplying electric power to the traveling part 21, cleaning unit 22, communication part 23, image pickup part 25, sensor part 26, control unit 27, and the like. In addition, the following description will be given on the assumption that a direction extending along the traveling direction of the vacuum cleaner 11 (main casing 20) is assumed as a back-and-forth direction (directions of arrows FR and RR shown in FIG. 2) while a left-and-right direction (directions toward both sides) intersecting (orthogonally crossing) the back-and-forth direction is assumed as a widthwise direction.

The main casing 20 is formed into a flat columnar shape (disc shape) or the like from a synthetic resin as an example. That is, the main casing 20 includes a side surface portion 20a, and an upper surface portion 20b and a lower surface portion 20c continuing from an upper portion and a lower portion of the side surface portion 20a, respectively. The side surface portion 20a of the main casing 20 connects the upper surface portion 20b and the lower surface portion 20c to each other, and is formed into a generally cylindrical-surface shape. The image pickup part 25 and the like as an example are disposed in the side surface portion 20a. Also, the upper surface portion 20b and the lower surface portion 20c of the main casing 20 are each formed into a generally circular shape, where a suction port 31 serving as a dust collecting port, an exhaust port 32 and the like are opened in the lower surface portion 20c facing the floor surface.

The traveling part 21 includes driving wheels 34, 34 as a plurality (pair) of driving parts, motors 35, 35 being driving means (drive members) as operating parts for driving the driving wheels 34, 34, a swing wheel 36 for swinging use, and the like.

Each of the driving wheels 34 makes the vacuum cleaner 11 (main casing 20) travel (autonomously travel) in an advancing direction and a retreating direction on the floor surface, that is, serves for traveling use. The driving wheels 34, having an unshown rotational axis extending along a left-and-right widthwise direction, are disposed widthwise symmetrical to each other.

Each of the motors 35 is disposed, for example, in correspondence with the driving wheels 34, respectively, and is enabled to drive the driving wheels 34 independently of each other.

The swing wheel 36, which is positioned at a generally central and front portion of the lower surface of the main casing 20 in the widthwise direction, is a driven wheel swingable along the floor surface.

The cleaning unit 22 includes an electric blower 41 which is positioned, for example, within the main casing 20 to suck dust and dirt along with air through the suction port 31 and discharge exhaust air through the exhaust port 32, a rotary brush 42 as a rotary cleaner which is rotatably attached to the suction port 31 to scrape up dust and dirt, as well as a brush motor 43 for rotationally driving the rotary brush 42, side brushes 44 which are auxiliary cleaning means (auxiliary cleaning parts) as swinging-cleaning parts rotatably attached on both sides of the main casing 20 on its front side or the like to scrape together dust and dirt, as well as side brush motors 45 for driving the side brushes 44, a dust collecting unit 46 which communicates with the suction port 31 to accumulate dust and dirt, and the like. In addition, with respect to the electric blower 41, the rotary brush 42 as well as the brush motor 43, and the side brushes 44 as well as the side brush motors 45, it is allowable that at least any one of these members is provided.

The communication part 23 includes a wireless LAN device 47 as wireless communication means (a wireless communication part) for performing wireless communication with the external device 17 via the home gateway 14 and the network 15 and as cleaner signal receiving means (a cleaner signal receiving part); unshown transmission means (a transmission part) such as an infrared emitting element for transmitting wireless signals (infrared signals) to the charging device 12 and the like; and unshown receiving means (a reception part) such as a phototransistor for receiving wireless signals (infrared signals) from the charging device 12 or an unshown remote control and the like.

The wireless LAN device 47, which performs transmission and reception of various types of information with the network 15 from the vacuum cleaner 11 via the home gateway 14, is contained in the main casing 20 as an example.

The image pickup part 25 includes cameras 51, 52 as (one and another) image pickup means (image pickup part bodies), and a lamp 53 such as an LED as illumination means (illumination part) for illuminating these cameras 51, 52.

The cameras 51, 52 are disposed on both sides of a front portion in the side surface portion 20a of the main casing 20. That is, in this embodiment, the cameras 51, 52 are disposed in the side surface portion 20a of the main casing 20 at positions which are skewed by a generally equal specified angle (acute angle) in the left-and-right direction with respect to a widthwise center line L of the vacuum cleaner 11 (main casing 20), respectively. In other words, these cameras 51, 52 are disposed generally symmetrically in the widthwise direction with respect to the main casing 20, and a center position of these cameras 51, 52 is generally coincident with a center position of the widthwise direction intersecting (orthogonally crossing) the back-and-forth direction, which is the traveling direction of the vacuum cleaner 11 (main casing 20). Further, these cameras 51, 52 are disposed at generally equal positions in an up/down direction, that is, generally equal height positions. Therefore, these cameras 51, 52 are set generally equal to each other in height from a floor surface while the vacuum cleaner 11 is set on the floor surface. Accordingly, the cameras 51, 52 are disposed at mutually separated shifted positions (positions shifted in the left/right direction). Also, the cameras 51, 52 are digital cameras which pick up digital images of a forward direction, which is the traveling direction of the main casing 20, at specified horizontal angles of view (e.g., 105°) and at specified time intervals, e.g., at a micro-time basis such as several tens of milliseconds or at a several-second basis. Further, these cameras 51, 52 have their fields of view V1, V2 overlapping with each other (FIG. 5), so that (one and another) images P1, P2 (FIG. 6(a) and FIG. 6(b)) picked up by the cameras 51, 52 have their image pickup regions overlapping in the left/right direction with each other in a part of those regions containing a forward position resulting from extending the widthwise center line L of the vacuum cleaner 11 (main casing 20). In this embodiment, the cameras 51, 52 are so designed to pick up images of a visible light region as an example. In addition, images picked up by the cameras 51, 52 may be compressed into a specified data format, for example, by an unshown image processing circuit or the like.

The lamp 53, serving to emit illuminating light for image pickup by the cameras 51, 52, is disposed at an intermediate position between the cameras 51, 52, that is, at a position on the center line L in the side surface portion 20a of the main casing 20. That is, the lamp 53 is distanced generally equal from the cameras 51, 52. Further, the lamp 53 is disposed at a generally equal position in the up/down direction, that is, a generally equal height position, to the cameras 51, 52. Accordingly, the lamp 53 is disposed at a generally center portion in the widthwise direction between the cameras 51, 52. In this embodiment, the lamp 53 is designed to illuminate light containing the visible light region.

The sensor part 26 includes, for example, a rotational speed sensor 55 such as an optical encoder for detecting rotational speed of each of the driving wheels 34 (each of the motors 35). Based on measured rotational speeds of the driving wheels 34 (motors 35), the rotational speed sensor 55 detects swing angle or progressional distance of the vacuum cleaner 11 (main casing 20). Therefore, the rotational speed sensor 55 is a position detection sensor for detecting a relative position of the vacuum cleaner 11 (main casing 20) from a reference position such as the charging device 12 (FIG. 7(a)) as an example.

The control unit 27 is, for example, a microcomputer including a CPU which is a control means main body (control unit main body), a ROM which is a storage section in which fixed data such as programs to be read by the CPU have been stored, a RAM which is an area storage section for dynamically forming various memory areas such as a work area serving as a working region for data processing by programs, and the like (where these component members are not shown). The control unit 27 further includes, for example, a memory 61 which is storage means (a storage part) for storing therein image data picked up by the cameras 51, 52 and the like, a depth calculation part 62 as calculation means (a calculation part) for calculating a depth of an object distanced from the cameras 51, 52 based on images picked up by the cameras 51, 52, an image processing part 63 as map generation means (map generation part) for generating a map of a cleaning area based on depths of objects calculated by the depth calculation part 62, an image generation part 64 as image generation means (an image generation part) for generating a distance image based on depths of objects calculated by the depth calculation part 62, a discrimination part 65 as obstacle discrimination means (an obstacle discrimination part) for discriminating obstacles based on depths calculated by the depth calculation part 62, and the like. The control unit 27 further includes a travel control part 66 for controlling operations of the motors 35, 35 (driving wheels 34, 34) of the traveling part 21, a cleaning control part 67 for controlling operations of the electric blower 41, the brush motor 43, and the side brush motors 45 of the cleaning unit 22, an image pickup control part 68 for controlling the cameras 51, 52 of the image pickup part 25, an illumination control part 69 for controlling the lamp 53 of the image pickup part 25, and the like. Then, the control unit 27 has, for example, a traveling mode for driving the driving wheels 34, 34 (motors 35, 35) to make the vacuum cleaner 11 (main casing 20) autonomously travel, a charging mode for charging the secondary battery 28 via the charging device 12, and a standby mode applied during a standby state.

The memory 61 is, for example, a nonvolatile memory such as a flash memory for holding various stored types of data regardless of whether the vacuum cleaner 11 is powered on or off.

Figure 1:
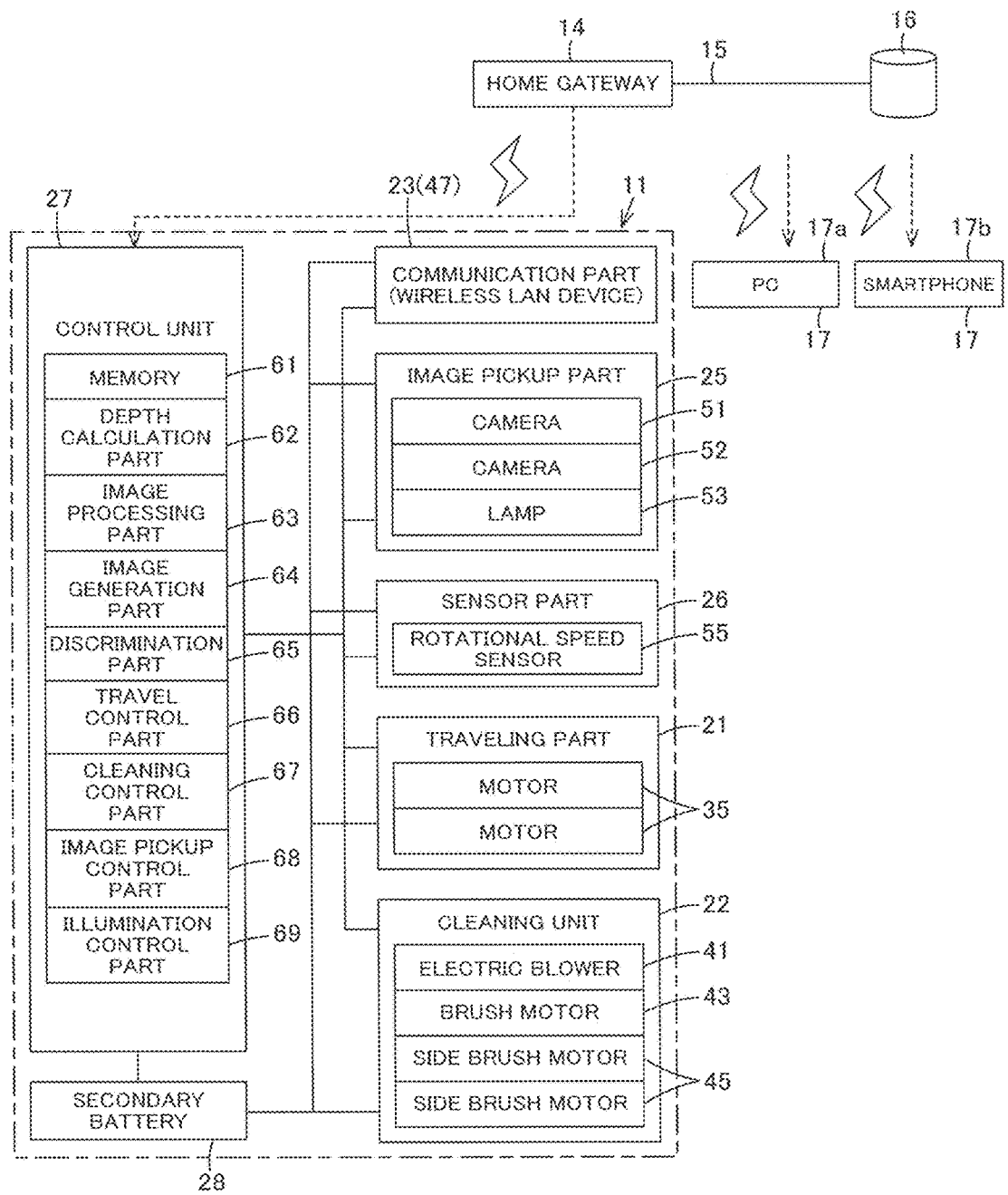
FIG. 1 is a block diagram showing an internal structure of a vacuum cleaner according to a first embodiment.
Figure 2:
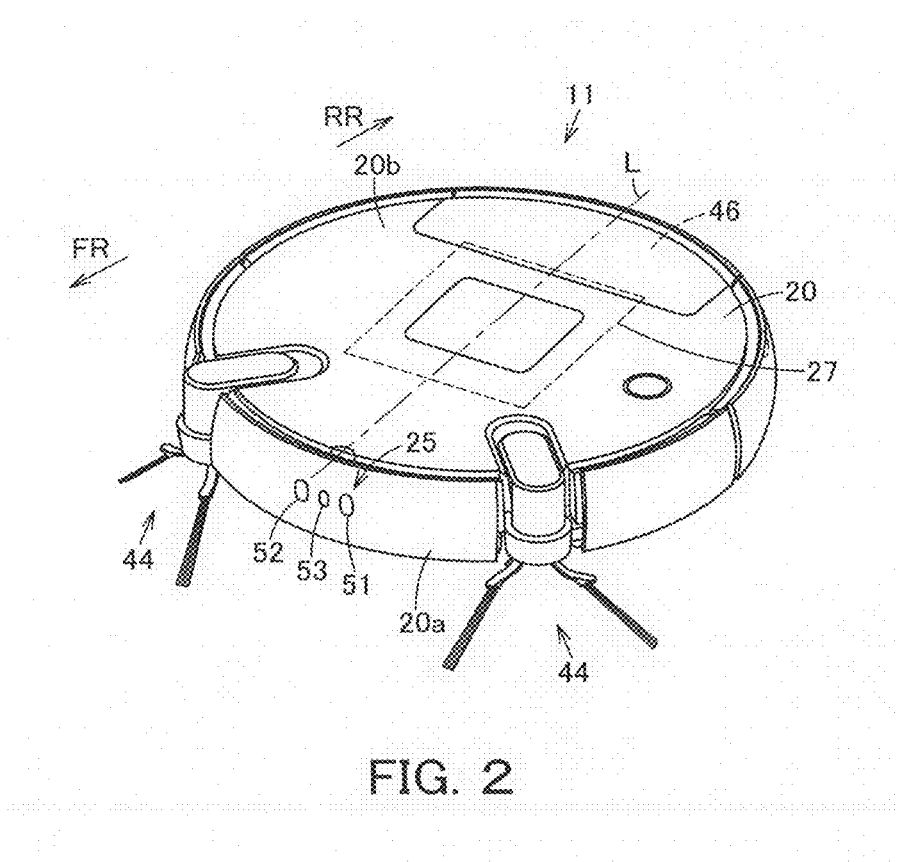
FIG. 2 is a perspective view showing the vacuum cleaner.
Figure 3:
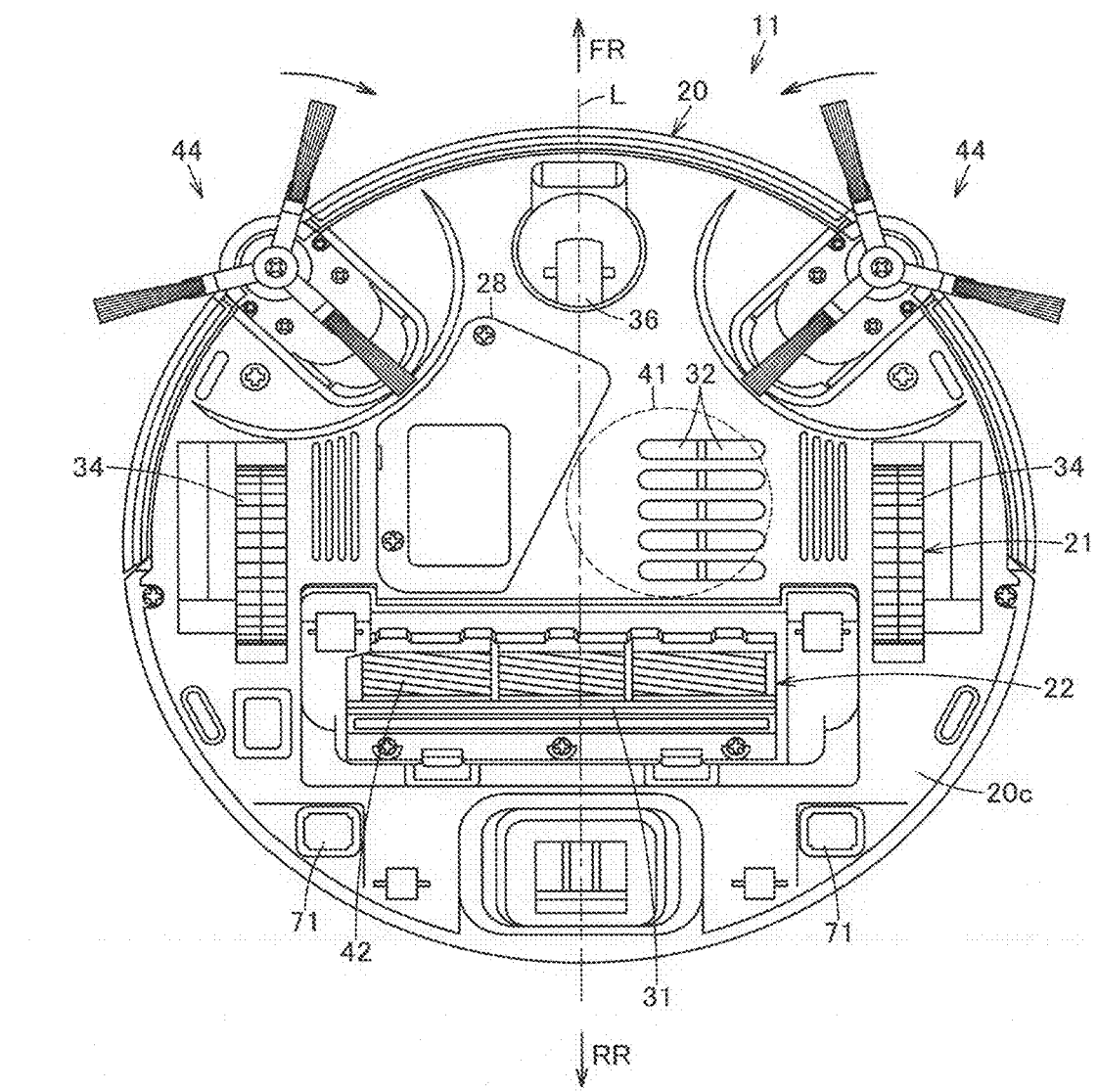
FIG. 3 is a plan view showing the vacuum cleaner as viewed from below.
Figure 4:
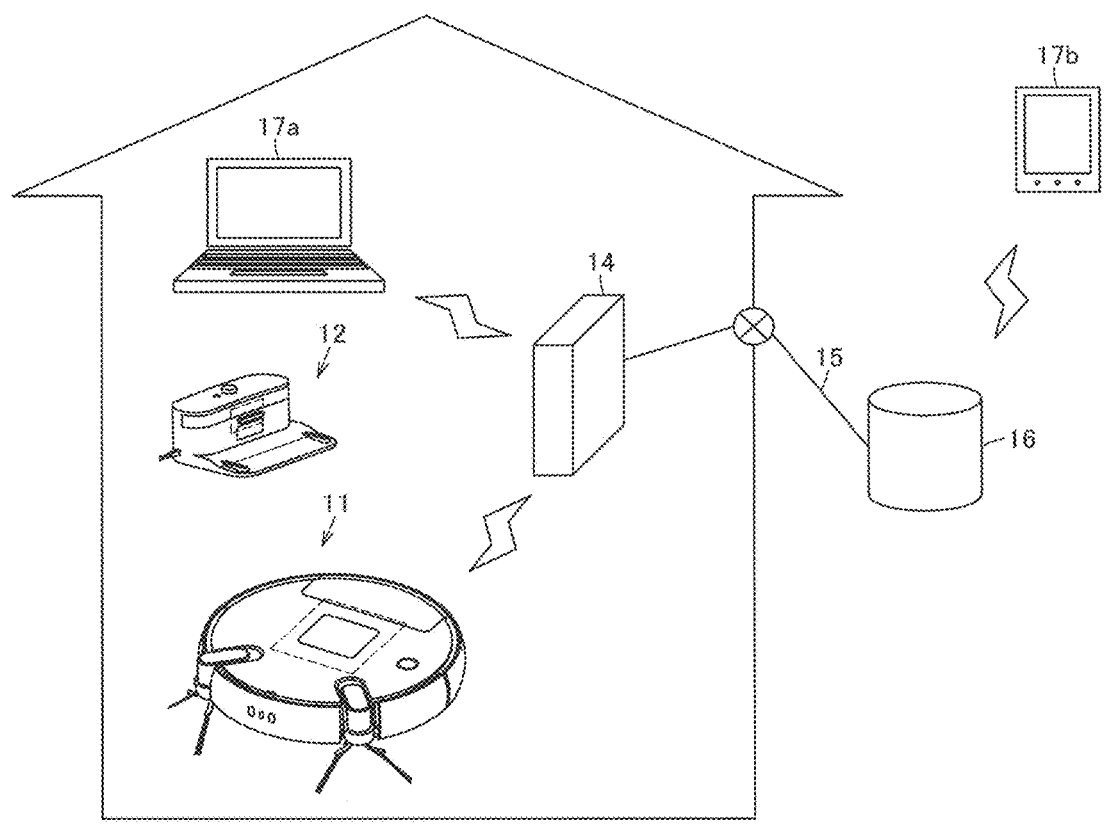
FIG. 4 is an explanatory view schematically showing a vacuum cleaner system including the vacuum cleaner.
Figure 5:
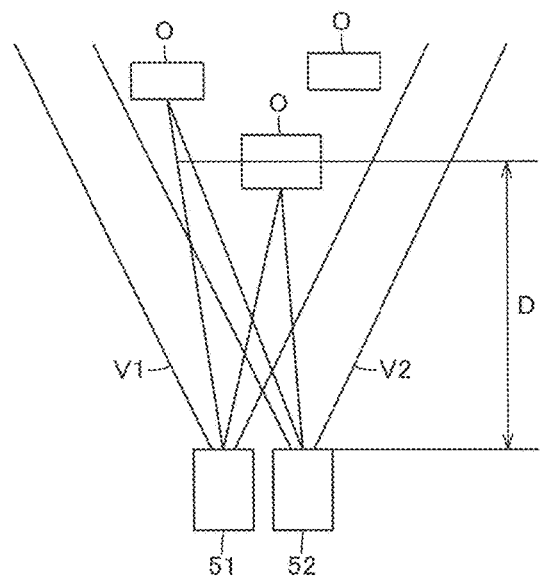
FIG. 5 is an explanatory view schematically showing a calculation method for a depth of an object by a calculator of the vacuum cleaner.

The depth calculation part 62 uses a known method to calculate a depth of an object O based on images picked up by the cameras 51, 52 and a distance between the cameras 51, 52 (FIG. 5). That is, the depth calculation part 62, in which triangulation is applied, detects image dots indicative of identical positions from within individual images picked up by the cameras 51, 52 and calculates angles of the image dots in the up/down direction and the left/right direction to calculate a depth from the cameras 51, 52 at that position from those angles and the distance between the cameras 51, 52. Therefore, it is preferable that images to be picked up by the cameras 51, 52 overlap with each other as much as possible.

The image processing part 63 calculates a distance between an object located around the vacuum cleaner 11 (main casing 20) and the vacuum cleaner 11 (main casing 20) from the depth of an object calculated by the depth calculation part 62, and calculates a positional relation among a cleaning area CA in which the vacuum cleaner 11 (main casing 20) is disposed and objects or the like located within this cleaning area CA from the calculated distance and a position of the vacuum cleaner 11 (main casing 20) detected by the rotational speed sensor 55 of the sensor part 26, so that the image processing part 63 generates a map M (FIG. 7(b)).

The image generation part 64 generates a distance image showing depths of objects calculated by the depth calculation part 62. Generation of this distance image by the image generation part 64 is implemented by displaying depths calculated by the depth calculation part 62 that are converted to visually discernible gradation levels such as brightness, color tone or the like on a specified dot basis such as a one-dot basis of images. In this embodiment, the image generation part 64 generates a distance image P3 (FIG. 6(c)) which is a black-and-white image whose brightness decreases more and more with increasing depth, that is, as a gray-scale image of 256 levels (=$2^8$ with 8 bits) as an example which increases in blackness with increasing distance and increases in whiteness with decreasing distance in a forward direction from the vacuum cleaner 11 (main casing 20). Accordingly, the distance image P3 is obtained by, as it were, visualizing a mass of depth data of objects positioned within an image pickup range of the cameras 51, 52 located forward in the traveling direction of the vacuum cleaner 11 (main casing 20).

The discrimination part 65 discriminates whether or not an object is an obstacle based on a depth of the object calculated by the depth calculation part 62. That is, the discrimination part 65 extracts a portion in a specified range, e.g. a rectangular-shaped specified image range A (FIG. 6(c)) in the distance image P3 from depths calculated by the depth calculation part 62, and compares the depth of the object O in the image range A to a set distance D (FIG. 5), which is a previously set or variably set threshold, to discriminate that the object O located at a depth (distance from the vacuum cleaner 11 (main casing 20)) equal to or smaller than the set distance D is an obstacle. The image range A is set in correspondence to up/down, left/right magnitudes of the vacuum cleaner 11 (main casing 20). That is, the image range A is set to a range having such up/down, left/right magnitudes that the vacuum cleaner 11 (main casing 20), when traveling straightforward as it is, comes into contact with the range.

The travel control part 66 controls magnitude and direction of currents flowing through the motors 35, 35 to make the motors 35, 35 rotated forward or reverse, thereby controlling the drive of the motors 35, 35. By controlling the drive of the motors 35, 35, the travel control part 66 controls the drive of the driving wheels 34, 34.

The cleaning control part 67 controls conduction angles of the electric blower 41, the brush motor 43 and the side brush motors 45, independently of one another, to control the drive of the electric blower 41, the brush motor 43 (rotary brush 42) and the side brush motors 45 (side brushes 44). In addition, control units may be provided in correspondence to the electric blower 41, the brush motor 43 and the side brush motors 45, independently and respectively.

The image pickup control part 68, including a control circuit for controlling operations of shutters of the cameras 51, 52, operates the shutters at specified time intervals, thus exerting control to pick up images by the cameras 51, 52 at every specified time interval.

The illumination control part 69 controls turn-on and -off of the lamp 53 via a switch or the like. The illumination control part 69, including a sensor for detecting brightness around the vacuum cleaner 11 in this embodiment, makes the lamp 53 lit when the brightness detected by the sensor is a specified level or lower, and otherwise, keeps the lamp 53 unlit.

The secondary battery 28 is electrically connected to charging terminals 71, 71 as connecting parts exposed on both sides of a rear portion in the lower surface of the main casing 20 as an example. With the charging terminals 71, 71 electrically and mechanically connected to the charging device 12 side, the secondary battery 28 is charged via the charging device 12.

The home gateway 14, which is also called access point or the like, is installed in a building and connected to the network 15 by wire as an example.

The server 16 is a computer (cloud server) connected to the network 15 and capable of storing therein various types of data.

The external device 17 is, for example, a general-purpose device such as a PC (tablet terminal (tablet PC)) 17a or smartphone (mobile phone) 17b which is enabled to make wired or wireless communication with the network 15 via the home gateway 14 as an example inside a building and which is enabled to make wired or wireless communication with the network 15 outside the building. This external device 17 has at least a display function of displaying images.

Next, operation of the above-described first embodiment will be described.

Generally, work of vacuum cleaner devices is roughly divided into cleaning work for carrying out cleaning by the vacuum cleaner 11, and charging work for charging the secondary battery 28 with the charging device 12. The charging work is implemented by a known method using a charging circuit such as a constant current circuit contained in the charging device 12. Therefore, only the cleaning work will be described below. In addition, there may also be included image pickup work for picking up images of specified objects by at least one of the cameras 51, 52 in response to instructions from the external device 17 or the like.

In the vacuum cleaner 11, at a timing such as an arrival at a preset cleaning start time or reception of a cleaning-start instruction signal transmitted by a remote control or the external device 17, the control unit 27 is switched over from standby mode to the traveling mode, so that the control unit 27 (travel control part 66) drives the motors 35, 35 (driving wheels 34, 34) and the vacuum cleaner 11 is separated from the charging device 12 to a specified distance. Then, the vacuum cleaner 11 generates a map of a cleaning area by the image processing part 63. That is, in the vacuum cleaner 11, the control unit 27 drives the motors 35, 35 (driving wheels 34, 34) at their positions (by the travel control part 66) to swing the vacuum cleaner 11 (main casing 20), during which images are picked up by the driven cameras 51, 52 (by the image pickup control part 68) (FIG. 7(a)) and distances between the vacuum cleaner 11 (main casing 20) and an object (wall, obstacle, etc.) surrounding the cleaning area CA are calculated by the depth calculation part 62 based on distances between the images and the cameras 51, 52. Then, based on the calculated distances and a relative position from the charging device 12 detected by the rotational speed sensor 55 of the sensor part 26, that is, the position of the vacuum cleaner 11 itself, the image processing part 63 maps a rough external shape or layout of the cleaning area CA. For example, as shown in FIG. 7(b), there may arise a part DA forming a dead angle of the cameras 51, 52 in the generated map M depending on the shape of the cleaning area CA or disposal of the object. However, with this part DA taken into consideration, the map can be made up for completion step by step by similarly measuring distances resulting from traveling and movement of the vacuum cleaner 11 (main casing 20) involved in the following cleaning work or by measuring distances to objects during the traveling. In addition, the map, once stored in the memory 61 or the like upon its generation, may be read from the memory 61 for the next and subsequent cleaning, eliminating the need for generating a map for each event of cleaning. However, in view of cases where a cleaning area CA different to the map stored in the memory 61 is to be cleaned or where the cleaning area CA, even if unchanged from the stored one, is changed in terms of layout of objects or the like, the map may be generated as required in response to a user's instruction, as an example, or at specified periods or the like, or otherwise, the once generated map may be updated from time to time based on depth measurement of objects during the cleaning work.

Figure 6:
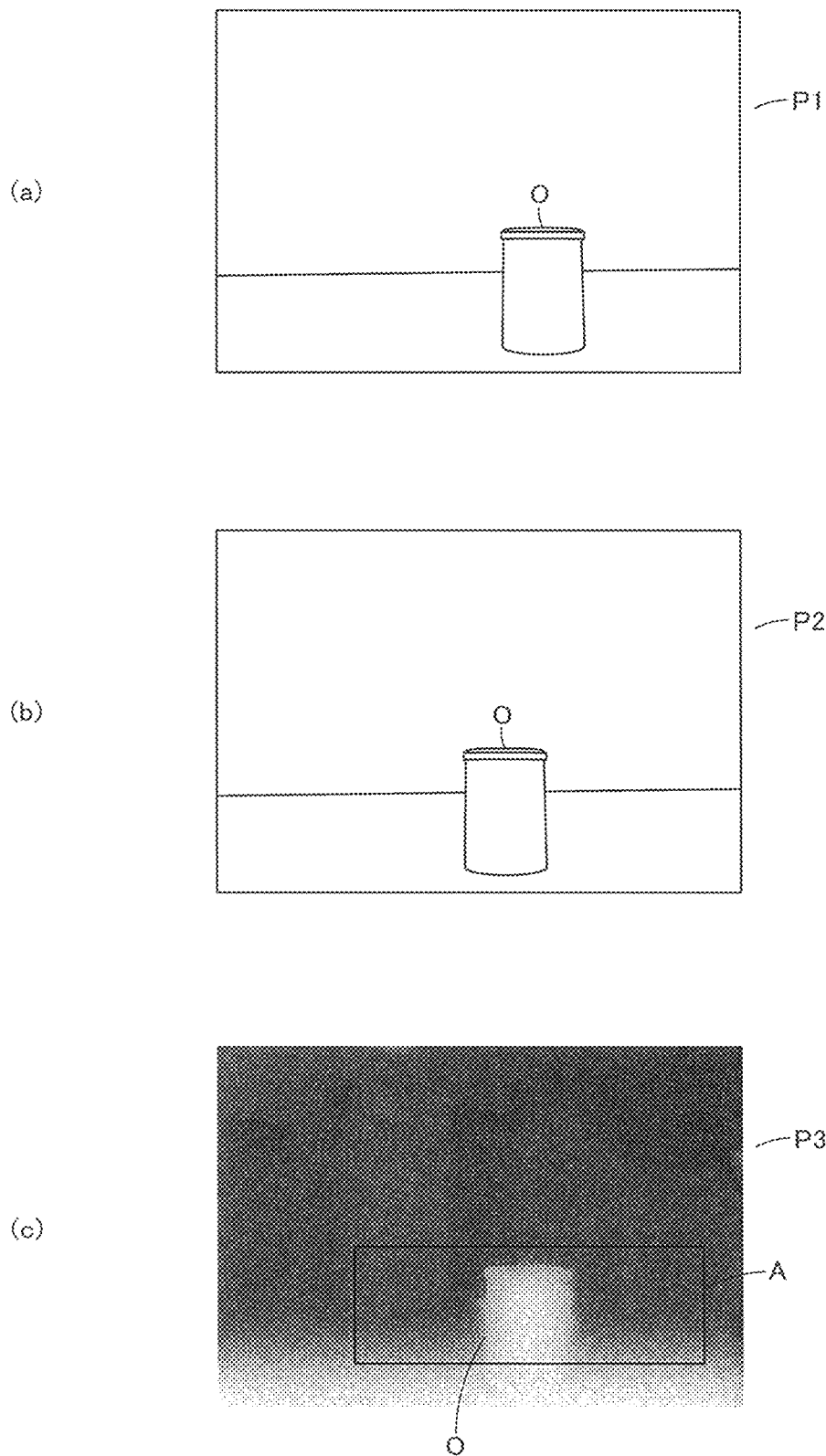
FIG. 6 (*a*) is an explanatory view showing an example of an image picked up by one camera, (*b*) is an explanatory view showing an example of an image picked up by the other camera, and (*c*) is an explanatory view showing an example of a distance image generated based on (*a*) and (*b*)
Figure 8:
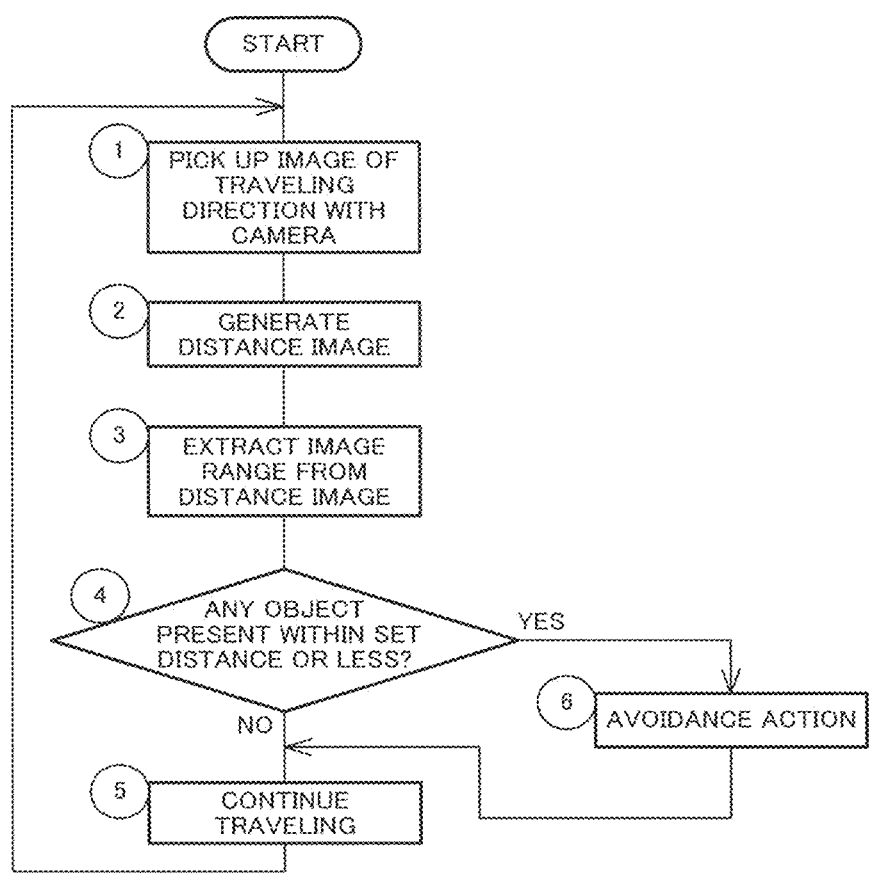
FIG. 8 is a flowchart showing travel control of the vacuum cleaner.

Next, based on the generated map, the vacuum cleaner 11 performs cleaning while autonomously traveling in the cleaning area CA. During this autonomous traveling, referring to the flowchart shown in FIG. 8, images of the forward traveling direction are first picked up by the cameras 51, 52 driven by the control unit 27 (image pickup control part 68) (step 1). At least any one of these picked-up images can be stored in the memory 61. Then, based on these images picked up by the cameras 51, 52 and their distances to the cameras 51, 52, depths of an object and the like are detected by the depth calculation part 62 and distance images are generated from the depths by the image generation part 64 (step 2). More specifically, for example, in a case where such images P1, P2 as shown in FIGS. 6(a) and 6(b) are picked up by the cameras 51, 52, an example of a distance image P3 generated by the image generation part 64 by calculating depths of the object picked up in the images P1, P2 by the depth calculation part 62 is shown in FIG. 6(c). The resulting distance image P3 can also be stored, for example, in the memory 61. Then, from the generated distance image P3, the discrimination part 65 cuts out a specified image range A (step 3) and compares depths of objects located within the image range A with a specified threshold to discriminate whether or not the object is equal to or lower than the threshold, in other words, whether or not an object having a specified set distance D or less is present within the image range A (step 4). In step 4, if it is discriminated that the object is not the specified set distance D or lower, that is, that the depth is larger than the threshold, then the vacuum cleaner 11 continues traveling as it is (step 5), returning to step 1. Meanwhile, if it is discriminated at step 4 that the object is not farther than the specified set distance D, in other words, that the depth is equal to or lower than the specified set distance D, then the object is discriminated as an obstacle that is a hindrance to traveling, followed by proceeding to a specified avoidance action routine (step 6). Although various methods are available as this avoidance action routine, one example is that the control unit 27 (travel control part 66) controls the drive of the motors 35, 35 (driving wheels 34, 34) to stop the vacuum cleaner 11 (main casing 20), where the vacuum cleaner 11 (main casing 20) swings so as to change the traveling direction at the stopped position or a position to which it has retreated a specified distance. After this avoidance action routine, the vacuum cleaner 11, proceeding to step 5, continues to travel. Thus, the vacuum cleaner 11 (main casing 20), while autonomously traveling all over the floor surface within the cleaning area CA under avoidance of obstacles, makes the cleaning unit 22 operated by the control unit 27 (cleaning control part 67) to clean dust and dirt on the floor surface. That is, the vacuum cleaner 11 performs next operations in continuation such as continuing the cleaning work even if an obstacle is detected.

In the cleaning unit 22, dust and dirt on the floor surface are collected to the dust collecting unit 46 via the suction port 31 by the electric blower 41, the rotary brush 42 (brush motor 43) or the side brushes 44 (side brush motors 45) driven by the control unit 27 (cleaning control part 67). Then, when the cleaning of the mapped cleaning area CA has been completed or when a specified condition is satisfied such as when the capacity of the secondary battery 28 has decreased to a specified level during the cleaning work so as to be insufficient for completion of cleaning or image pickup (the voltage of the secondary battery 28 has decreased to around a discharge termination voltage), the vacuum cleaner 11 controls the operation of the motors 35, 35 (driving wheels 34, 34) by the control unit 27 (travel control part 66) so that the vacuum cleaner 11 returns to the charging device 12. Thereafter, when the charging terminals 71, 71 and terminals for charging of the charging device 12 are docked together, the cleaning work is ended and the control unit 27 shifts to the standby mode or the charging mode.

In addition, data of images stored in the memory 61 are transmitted to the server 16 via the home gateway 14 and the network 15 by means of the wireless LAN device 47, for example, upon a return of the vacuum cleaner 11 to the charging device 12, from time to time during the cleaning work, at specified time intervals, in the event of a request from the external device 17, or the like. In addition, when data that have been transmitted completely are deleted from the memory 61 or overwritten when storing new data, the capacity of the memory 61 can be used more efficiently.

The server 16 is able to store image data transmitted from the vacuum cleaner 11 and image data may be downloaded from the server 16 in response to a request (access) from the external device 17.

Then, on the external device 17, an image downloaded from the server 16 is displayed.

As described above, according to the first embodiment, since the cameras 51, 52 are disposed at positions generally equal to each other in the up/down direction, that is, generally equal in height to each other, images picked up by the cameras 51, 52 overlap with each other in the left/right direction without shifting to a large degree in the up/down direction. Therefore, a wider overlapping range between the images can be ensured so that the efficiency of depth calculations by the depth calculation part 62 is improved and moreover the cameras 51, 52 are required to pick up less images of ranges that are unlikely to be obstacles in traveling of the vacuum cleaner 11 (main casing 20) such as a ceiling and a floor as an example. Thus, depth calculations for objects by the depth calculation part 62 can be concentrated on parts that are highly likely to be obstacles to the travel of the vacuum cleaner 11 (main casing 20), making it more efficient for the discrimination part 65 to discriminate obstacles based on the calculated depths of objects.

Also, since the cameras 51, 52 pick up images of the visible light region, picked-up images have favorable image quality and the images can be easily displayed so as to be visible to users without being subjected to any complex image processing. Moreover, with the illumination of light containing the visible light region provided by the lamp 53, images can be picked up securely by the cameras 51, 52 even in dark places or at night or the like.

Figure 9:
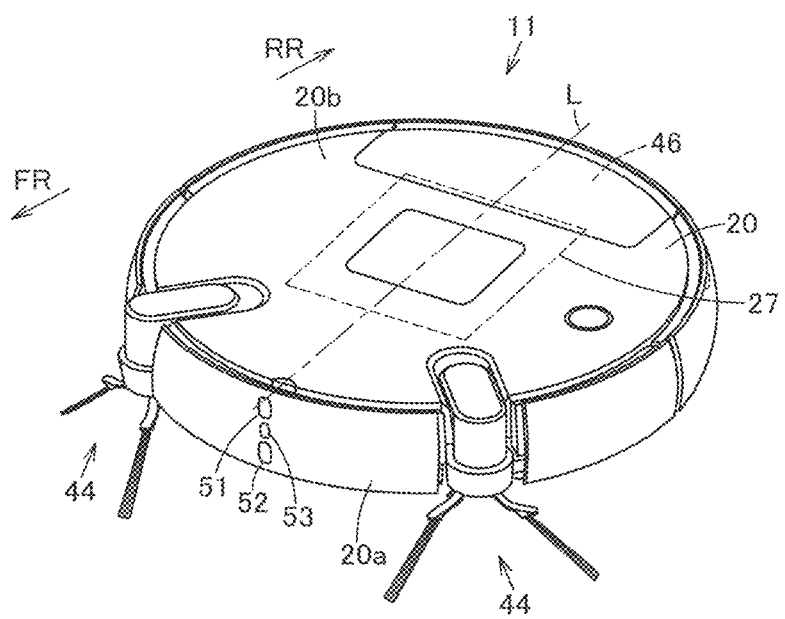
FIG. 9 is a perspective view showing a vacuum cleaner according to a second embodiment.

In addition, in the above-described first embodiment, the cameras 51, 52 may be disposed at generally equal positions in the left/right direction on the main casing 20 (side surface portion 20a), that is, at up-and-down positions as in a second embodiment shown in FIG. 9 as an example. In this case, the cameras 51, 52 are disposed above and below on the center line L, that is, above and below symmetrically, with the lamp 53 disposed at an intermediate position between the cameras 51, 52. As a result of this, images picked up by the cameras 51, 52 overlap in the up/down direction with each other without being shifted to a large degree in the left/right direction. Therefore, a wider range of overlaps among the images can be ensured, so that the efficiency of depth calculations by the depth calculation part 62 is improved and moreover objects whose depths are to be calculated by the depth calculation part 62 can be taken over a wider range in the left/right direction in images. Thus, map generation by the image processing part 63 can be achieved efficiently.

Further, in the above-described individual embodiments, the cameras 51, 52 may be provided by infrared cameras for picking up images of infrared regions. In this case, with illumination of light containing infrared regions provided by the lamp 53, stable images can be obtained regardless of daytime or nighttime, and moreover, even in dark places or at night, images can be picked up while the darkness remains unchanged without brightening the surroundings.

Furthermore, one of the cameras 51, 52 may be dedicated to picking up images of the visible light region while the other may be dedicated to picking up images of the infrared region. In this case, images of the visible light region with favorable image quality can easily be displayed so as to be visible to the user.

For image display, in addition to a constitution including processing for enabling image display by the external device 17 by the control unit 27, there may be adopted, for example, processing for enabling image display by the external device 17 with exclusive-use programs (applications) installed in the external device 17, or otherwise, it is also allowed that after preprocessing is done by the control unit 27 or the server 16, image display is implemented with a general-purpose program such as a browser of the external device 17 or the like. That is, a constitution in which display control means (a display control part) to implement the image display may be adopted through the use of a program stored in the server 16, a program installed on the external device 17, and the like.

Although data of images or the like temporarily stored in the memory 61 are transmitted to the server 16 and stored in the server 16, the data may be stored in the memory 61 as it is or stored in the external device 17.

Images picked up by the cameras 51, 52 or distance images generated by the image generation part 64 may also be displayed, for example, on a display part provided in the vacuum cleaner 11 itself without being limited to the external device 17. In this case, there is no need to transmit data from the memory 61 to the server 16 via the home gateway 14 and the network 15, allowing the constitution and control of the vacuum cleaner 11 to be further simplified.

Moreover, as auxiliary aids for the detection of obstacles by the cameras 51, 52, there may be separately provided sensors such as a contact sensor for obstacle detection at positions out of the field of view of the cameras 51, 52, such as in a rear portion of the main casing 20, or step gap detection means (a step gap sensor) such as an infrared sensor for detecting step gaps of the floor surface or the like may be provided in the lower surface portion 20c of the main casing 20.

Although the depth calculation part 62, the image generation part 64, the discrimination part 65, the cleaning control part 67, the image pickup control part 68 and the illumination control part 69 are each provided in the control unit 27, these members may also be provided as independent members, respectively, or two or more among these members may be arbitrarily combined with one another.

Further, the depth calculation by the depth calculation part 62 may be applied not only during cleaning work but also to any arbitrary use during traveling of the vacuum cleaner 11 (main casing 20).

According to at least one of the above-described embodiments, since the cameras 51, 52 for picking up images of the main casing 20 on its traveling direction side are disposed in the main casing 20 so as to be apart from each other and have their fields of view overlapping with each other, and moreover, since depths of objects distanced from the cameras 51, 52 are calculated by the depth calculation part 62 based on images picked up by these cameras 51, 52, objects and their distances can be detected without being affected by physical properties (softness, color, etc.) of the objects and without overlooking small objects, as compared with cases in which an infrared sensor or an ultrasonic sensor or the like is used as an example. Accordingly, the detection precision for obstacles can be improved.

In more detail, since the depth calculation part 62 calculates a depth of an object based on images picked up by each of the cameras 51, 52 and a distance between the cameras 51, 52, the depth of an object can be calculated with high precision without requiring any particularly complex calculations or processing.

Also, since the center position between the cameras 51, 52 is generally coincident with the center position in the widthwise direction intersecting (orthogonally crossing) the traveling direction of the vacuum cleaner 11 (main casing 20), that is, since the cameras 51, 52 are disposed symmetrically on the left and right of the vacuum cleaner 11 (main casing 20), it follows that when an obstacle such as a wall is present on the left and right of the vacuum cleaner 11 (main casing 20) as an example, the obstacle can be discriminated by the discrimination part 65 without any bias toward the left or right side, and moreover, that the overlapping portion between images picked up by the cameras 51, 52 is uniform between the left and right. Thus, the obstacle discrimination by the discrimination part 65 can be fulfilled over a wider range and in left-and-right symmetry.

Further, since the cameras 51, 52 are disposed in the side surface portion 20a of the main casing 20, images of the forward traveling direction of the main casing 20 can be easily picked up and moreover less image pickup of ranges that are unlikely to be obstacles in traveling of the vacuum cleaner 11 (main casing 20) such as a ceiling and a floor is achieved, so that depths of objects that are to be obstacles to the traveling of the vacuum cleaner 11 (main casing 20) can be calculated efficiently by the depth calculation part 62. In particular, in the case where the side surface portion 20a of the main casing 20 is formed into a cylindrical-surface shape and the cameras 51, 52 are disposed in the side surface portion 20a symmetrically from the center line L, the angular range of images to be picked up by the cameras 51, 52 can be made generally uniform between left and right, so that depths of objects can be calculated more efficiently by the depth calculation part 62.

Also, since a map of the cleaning area is generated by the image processing part 63 based on depths of objects calculated by the depth calculation part 62, efficient traveling of the vacuum cleaner 11 (main casing 20) within the cleaning area can be achieved based on the resulting map during the cleaning work or the like.

Furthermore, by disposing the lamp 53 between the cameras 51, 52, the two cameras 51, 52 can be illuminated by the one lamp 53, respectively. Moreover, with a simpler constitution as compared with cases in which a plurality of lamps is used, the directions of light and shadow impinging on images picked up by the cameras 51, 52 become uniform so that disturbance is unlikely to occur, making it easier to achieve depth calculations for objects based on those images.

Then, based on a depth of an object calculated by the depth calculation part 62, it is discriminated by the discrimination part 65 whether or not the object is an obstacle. Then, the control unit 27 (travel control part 66) controls the drive of the driving wheels 34, 34 (motors 35, 35) so as to avoid the object, which has been discriminated as an obstacle by the discrimination part 65. Thus, the precision of autonomous traveling can be improved so that the cleaning area can be efficiently cleaned more thoroughly.

Furthermore, with a distance image generated by the image generation part 64 based on depths of objects calculated by the depth calculation part 62, an obstacle can be easily discriminated by the discrimination part 65 based on the distance image. Moreover, with the resulting distance image visibly displayed on the external device 17 or the like, the user can check the position and traveling direction of the vacuum cleaner 11 (main casing 20) or grasp any obstacle that obstructs the traveling of the vacuum cleaner 11 (main casing 20). Therefore, the user can be prompted to make an obstacle that obstructs the traveling of the vacuum cleaner 11 (main casing 20) be spontaneously moved or removed.

Further, since an object located closer than a specified distance in a specified image range within a distance image generated by the image generation part 64 is discriminated as an obstacle by the discrimination part 65, higher-speed processing is possible as compared with cases in which an obstacle is detected from the whole distance image. Moreover, with the image range set in consideration of positions through which the vacuum cleaner 11 (main casing 20) can be expected to actually travel (travel expected position), processing only within the image range makes it possible to sufficiently detect obstacles that obstruct the traveling because any obstacle, even if present at any position other the expected positions, has no effect on the autonomous traveling of the vacuum cleaner 11 (main casing 20). Furthermore, with an upper limit of the image range set in correspondence to the height of the main casing 20, even gaps in the heightwise direction which the vacuum cleaner 11 (main casing 20) can enter can also be detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

A control method for a vacuum cleaner in which a main casing having a cleaning unit and a plurality of cameras is enabled to autonomously travel, the method comprising the steps of: picking up, by the plurality of cameras, images on a traveling-direction side of the main casing with their fields of view overlapping with each other; and calculating depths of an object distanced from the cameras based on the picked-up images.

The control method for a vacuum cleaner as described above, wherein a center position of the cameras of the vacuum cleaner is generally coincident with a center position of a widthwise direction intersecting a traveling direction of the main casing.

The control method for a vacuum cleaner as described above, wherein the cameras of the vacuum cleaner are disposed in a side surface portion of the main casing.

The control method for a vacuum cleaner as described above, wherein the cameras of the vacuum cleaner are disposed at positions, respectively, which are generally equal to each other in an up/down direction.

The control method for a vacuum cleaner as described above, wherein the cameras of the vacuum cleaner are disposed at positions, respectively, which are generally equal to each other in a left/right direction.

The control method for a vacuum cleaner as described above, further comprising the step of generating a map of a cleaning area based on calculated depths of objects.

The control method for a vacuum cleaner as described above, further comprising the step of, while illuminating light containing a visible light region, picking up images of the visible light region with the individual cameras.

The control method for a vacuum cleaner as described above, further comprising the step of, while illuminating light containing an infrared region, picking up images of the infrared region with the individual cameras.

The control method for a vacuum cleaner as described above, further comprising the step of picking up images of the visible light region with one of the cameras and picking up images of the infrared region while illuminating light containing the infrared region with the other of the cameras.

The control method for a vacuum cleaner as described above, wherein illumination of light is provided at a position between the cameras.

The control method for a vacuum cleaner as described above, further comprising the steps of discriminating based on a calculated depth of an object whether or not the object is an obstacle, and avoiding an object which has been discriminated as an obstacle.

The control method for a vacuum cleaner as described above, further comprising the step of calculating a depth of an object based on images picked up by each camera and a distance between the cameras.

The control method for a vacuum cleaner as described above, further comprising the step of generating a distance image based on the calculated depth of an object.

The control method for a vacuum cleaner as described above, further comprising the step of discriminating, as an obstacle, an object which is located closer than a specified distance in a specified image range in the generated distance image.

The invention claimed is:

1. A vacuum cleaner comprising:
   a main casing;
   a driving wheel for enabling the main casing to travel;
   a control unit for controlling drive of the driving wheel to thereby make the main casing autonomously travel,
   a cleaning unit for cleaning a cleaning-object surface;
   cameras disposed apart from each other in the main casing and serving for picking up images on a traveling-direction side of the main casing with their fields of view overlapping with each other;
   a calculator for calculating a depth of an object distanced from the cameras based on images picked up by the cameras;
   an image generation pan for generating a distance image based on a depth of an object calculated by the calculator; and
   an obstacle discrimination part for discriminating an object located closer than a specified distance within the distance image as an obstacle.

2. The vacuum cleaner in accordance with claim 1, wherein
   a center position of the cameras is generally coincident with a center position of a widthwise direction intersecting a traveling direction of the main casing.

3. The vacuum cleaner in accordance with claim 1, wherein
   the main casing includes a side surface portion, and
   the cameras are disposed in the side surface portion.

4. The vacuum cleaner in accordance with claim 3, wherein
   the cameras are disposed at positions, respectively, which are generally equal to each other in an up/down direction.

5. The vacuum cleaner in accordance with claim 3, wherein
   the cameras are disposed at positions, respectively, which are generally equal to each other in a left/right direction.

6. The vacuum cleaner in accordance with claim 1, further comprising
   a map generation part for generating a map of a cleaning area based on depths of objects calculated by the calculator.

7. The vacuum cleaner in accordance with claim 1, further comprising
   a lamp for illuminating light containing a visible light region, wherein
   the individual cameras pick up images of the visible light region.

8. The vacuum cleaner in accordance with claim 7, wherein
   the lamp is disposed between the cameras.

9. The vacuum cleaner in accordance with claim 1, further comprising
   a lamp for illuminating light containing an infrared region, wherein
   the individual cameras pick up images of the infrared region.

10. The vacuum cleaner in accordance with claim 1, further comprising
    a lamp for illuminating light containing an infrared region, wherein
    one of the cameras picks up images of a visible light region, and
    an other of the cameras picks up images of the infrared region.

11. The vacuum cleaner in accordance with claim 1, wherein the control unit controls drive of the driving wheels so as to avoid an object discriminated as an obstacle by the obstacle discrimination part.

12. The vacuum cleaner in accordance with claim 1, wherein
the calculator calculates a depth of an object based on images picked up by the individual cameras and a distance between the cameras.

13. The vacuum cleaner in accordance with claim 1, wherein
the obstacle discrimination part discriminates, as an obstacle, an object which is located closer than a specified distance in a specified image range in the distance image generated by the image generation part.

14. A control method for a vacuum cleaner in which a main casing having a cleaning unit and a plurality of cameras is enabled to autonomously travel, the method comprising:
picking up, by the plurality of cameras, images on a traveling direction side of the main casing with their fields of view overlapping with each other;
calculating depths of an object distanced from the cameras based on the picked-up images;
generating a distance image based on the calculated depths of an object; and
discriminating an object located closer than a specified distance within the distance image as an obstacle.

* * * * *